United States Patent
Bokkers et al.

(10) Patent No.: US 11,891,570 B2
(45) Date of Patent: Feb. 6, 2024

(54) SALT OF MONOCHLOROACETIC ACID WITH ACID FOR DELAYED ACIDIFICATION IN THE OIL FIELD INDUSTRY

(71) Applicant: NOURYON CHEMICALS INTERNATIONAL B.V., Amsterdam (NL)

(72) Inventors: Albert Bokkers, Deventer (NL); Cornelis Elizabeth Johannus Van Lare, Wijchen (NL); Cornelis Kooijman, Deventer (NL); Maria Antonieta Leon Matheus, Epse (NL)

(73) Assignee: NOURYON CHEMICALS INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 17/999,239

(22) PCT Filed: May 14, 2021

(86) PCT No.: PCT/EP2021/062832
§ 371 (c)(1),
(2) Date: Nov. 18, 2022

(87) PCT Pub. No.: WO2021/233782
PCT Pub. Date: Nov. 25, 2021

(65) Prior Publication Data
US 2023/0212453 A1 Jul. 6, 2023

(30) Foreign Application Priority Data

May 20, 2020 (EP) .................................... 20175675
May 20, 2020 (EP) .................................... 20175679
Jun. 23, 2020 (EP) .................................... 20181769

(51) Int. Cl.
*E21B 43/27* (2006.01)
*C09K 8/74* (2006.01)
*C09K 8/524* (2006.01)

(52) U.S. Cl.
CPC ................ *C09K 8/74* (2013.01); *C09K 8/524* (2013.01); *E21B 43/27* (2020.05)

(58) Field of Classification Search
CPC .................................. C09K 8/74; C09K 8/524
See application file for complete search history.

(56) References Cited

U.S. PATENT DOCUMENTS

| | | | |
|---|---|---|---|
| 2,301,875 A | 11/1942 | Holmes | |
| 3,885,630 A | 5/1975 | Richardson | |
| 3,889,753 A | 6/1975 | Richardson | |
| 4,122,896 A | 10/1978 | Scheuerman et al. | |
| 7,060,661 B2 | 6/2006 | Dobson et al. | |
| 7,638,469 B2 * | 12/2009 | Heidenfelder | C09K 8/54 507/135 |
| 8,727,002 B2 * | 5/2014 | Reyes | C09K 8/78 166/305.1 |
| 10,131,831 B2 * | 11/2018 | Rimassa | C09K 8/74 |
| 2004/0152601 A1 | 8/2004 | Still et al. | |
| 2005/0016731 A1 | 1/2005 | Rae et al. | |
| 2009/0042748 A1 | 2/2009 | Fuller | |

FOREIGN PATENT DOCUMENTS

| | | |
|---|---|---|
| CN | 105018061 A | 11/2015 |
| GB | 1258068 A | 12/1971 |
| RU | 2311439 C2 | 11/2007 |
| RU | 2447125 C1 | 4/2012 |
| WO | 2009016549 A2 | 2/2009 |
| WO | 2014150499 A1 | 9/2014 |
| WO | 2014209649 A1 | 12/2014 |
| WO | 2016053283 A1 | 4/2016 |
| WO | 2020002011 A1 | 1/2020 |

OTHER PUBLICATIONS

Abrams A. et al., "Higher-pH acid Stimulation Systems", Journal of Petroleum Technology, Society of Petroleum Engineers, US, vol. 35, No. 12, Dec. 1983, pp. 2175-2184, XP002686570.

* cited by examiner

*Primary Examiner* — Silvana C Runyan
(74) *Attorney, Agent, or Firm* — LORENZ & KOPF, LLP

(57) ABSTRACT

A process for treating a subterranean earth formation by includes the step of introducing a buffered acidizing treatment fluid comprising a monovalent salt of monochloroacetic acid and at least one acid into the subterranean earth formation, wherein the pH of the buffered acidizing treatment fluid is from about 1.2 to about 5. The buffered acidizing treatment fluid itself includes the monovalent salt of monochloroacetic acid, the at least one acid and optionally an element to suppress salt precipitation.

20 Claims, 2 Drawing Sheets

SALT OF MONOCHLOROACETIC ACID WITH ACID FOR DELAYED ACIDIFICATION IN THE OIL FIELD INDUSTRY

CROSS-REFERENCE TO RELATED APPLICATION

This application is a U.S. National-Stage entry under 35 U.S.C. § 371 based on International Application No. PCT/EP2021/062832, filed May 14, 2021 which was published under PCT Article 21(2) and which claims priority to European Application No. 20175675.6, filed May 20, 2020, European Application No. 20175679.8, filed May 20, 2020 and European Application No. 20181769.9, filed Jun. 23, 2020, which are all hereby incorporated in their entirety by reference.

TECHNICAL FIELD

The present disclosure is directed to a process for treating a subterranean earth formation and an aqueous acidizing treatment fluid therefor.

BACKGROUND

Acidification fluids are commonly used in the oil industry to create wormholes to connect the wellbore with the formation. Typically, 15-28% hydrochloric acid (HCl) has been used but it has a disadvantage related to its high reactivity with the calcium carbonate ($CaCO_3$) present in the limestone reservoirs. The reactivity of the HCl is highly affected by the temperature in the reservoir. The higher the temperature, the faster the HCl reacts hence forming wormholes with unstable structures that then collapse and block the access to the formation. For the previous reasons the use of HCl alone (i.e. without additives) is less preferred, especially at higher temperatures. Another disadvantage is its high corrosivity. To this end several corrosion inhibitors have been proposed, but the known commercial corrosion inhibitors are expensive and their performance at higher temperatures leaves much to be desired. As a rule of thumb, up to 200° F. (93° C.) the treatment can be performed with HCl and a corrosion inhibitor, but above 200° F. (93° C.) a corrosion inhibitor intensifier is also needed. Corrosion inhibitor intensifiers are costly. They can be up to 60% of the total costs of the treatment. Furthermore, stability of the additives becomes a problem.

There is a need to access deeper wells as many of the recently discovered reservoirs are categorized as High Pressure High Temperature (HPHT). In that sense, it is of interest to find an alternative option to the HCl which is not as reactive when exposed to high temperatures and offers an acidification feature which can be released in a controlled fashion.

To this end, several patent publications were issued concerning delayed acidification using the hydrolysation of chlorocarboxylic acid salts. During the hydrolyzation glycolic acid is formed.

U.S. Pat. No. 3,885,630 is directed to a method wherein acid-reactive material in or around a bore hole or well is acidized by contacting water-soluble weak acid and water-soluble weak acid salt such as acetic acid and sodium acetate.

U.S. Pat. No. 4,122,896 is directed to a method wherein subterranean reservoirs are acidized by injecting a substantially acid-free aqueous solution of a chloro carboxylic acid salt, such as mono or di-chloro acetic acid salt or 2 chloro propionic acid salt, into the reservoir.

We have found however, that the glycolic acid formed reacts with the calcium carbonate being present in the limestone reservoirs forming calcium glycolate. Calcium glycolate has low solubility and precipitates easily. Precipitation of calcium glycolate during acidation in the oil wells (also referred to as scaling) is undesirable. The calcium glycolate may cause plugging in the confinements such as the piping if a sufficient amount of precipitate is formed. It was further found that solutions with calcium glycolate in solution form a gel upon cooling to room temperature. This gel formation may cause plugging of the pipes as the acidification fluid is pumped back above ground level and/or while it is later stored.

The formation of calcium glycolate limits the amount of chlorocarboxylic acid salts that can be used in the aqueous acidizing treatment fluid. This, in turn, limits the capacity of the aqueous acidizing treatment fluid for acidization.

To address this issue, WO 2020/002011 A1 discloses introducing a monovalent salt of monochloroacetic acid into a subterranean earth formation in the presence of a chelating agent, which comprises at least one carboxylate group having a monovalent counterion and furthermore comprises a carbon chain carrying at least five hydroxyl groups. The addition of the chelating agent inhibits formation of calcium glycolate such that the monovalent salt of monochloroacetic acid can be present in the aqueous acidizing treatment fluid in higher amounts.

However, there is still a need to improve the fluid capacity of delayed acidification treatment fluids containing chlorocarboxylic acid salts.

SUMMARY OF THE DISCLOSURE

In a first aspect, the present disclosure is directed to a process for treating a subterranean earth formation by introducing a buffered acidizing treatment fluid comprising a monovalent salt of monochloroacetic acid and at least one acid into said subterranean earth formation, wherein the pH of the buffered acidizing treatment fluid is from about 1.2 to about 5, preferably from about 2 to about 4.6.

The at least one acid may be an inorganic or organic acid with a pKa value of about 5 or lower. Preferably, the at least one acid is selected from hydrochloric acid, chloric acid ($HClO_3$), hydrobromic acid (HBr), nitric acid ($HNO_3$), perchloric acid ($HClO_4$), hydroiodic acid (HI), formic acid, acetic acid, methanesulfonic acid (MSA), p-toluenesulfonic acid, or any combination thereof.

The at least one acid may be present in the buffered acidizing treatment fluid in an amount of from about 0.2 to about 25 wt %, based on the total weight of the buffered acidizing treatment fluid. Preferably, the monovalent salt of monochloroacetic acid is present in the buffered acidizing treatment fluid in an amount of from about 3 to about 20 wt %, based on the total weight of the buffered acidizing treatment fluid.

In one embodiment, an element to suppress salt precipitation is also introduced into the subterranean earth formation. The element to suppress salt precipitation may be present in the buffered acidizing treatment fluid in an amount of from about 0.005 to about 30 wt %, based on the total weight of the buffered acidizing treatment fluid. The element to suppress salt precipitation may be a scale inhibitor or a chelating agent.

A preferred element to suppress salt precipitation is a chelating agent, more preferably, a chelating agent comprising at least one monovalent carboxylate salt group and furthermore comprises a carbon chain carrying at least five hydroxyl groups. Particularly preferred is a chelating agent comprising sodium gluconate.

Another preferred element to suppress salt precipitation is a scale inhibitor, more preferably, a scale inhibitor comprising a homopolymer of maleic acid or acrylic acid or a copolymer of maleic acid and acrylic acid, having a total number of carboxyl groups between 5 and 200, or a salt thereof, wherein the homopolymer or copolymer optionally contains one or more phosphonic or sulfonic functional groups, and wherein total number of carboxyl groups is calculated from the weight average molecular weight of the homopolymer or copolymer as determined by size exclusion chromatography relative to polymethacrylic acid standards.

The present disclosure is further directed to a buffered acidizing treatment fluid comprising
(i) a monovalent salt of monochloroacetic acid;
(ii) at least one acid; and
(iii) optionally, an element to suppress salt precipitation,
wherein the pH of the buffered acidizing treatment fluid is from about 1.2 to about 5, preferably from about 2 to about 4.6.

The monovalent salt of monochloroacetic acid may be present in an amount of from about 3 to about 20 wt %, the at least one acid may be present in an amount of from about 0.2 to about 25 wt %, and the element to suppress salt precipitation, when included, may be present in an amount of from about 0.005 to about 30 wt %, wherein all amounts are based on the total weight of the buffered acidizing treatment fluid.

BRIEF DESCRIPTION OF THE DRAWINGS

The present disclosure will hereinafter be described in conjunction with the following drawing figures, wherein like numerals denote like elements, and.

DETAILED DESCRIPTION

Figure 1:
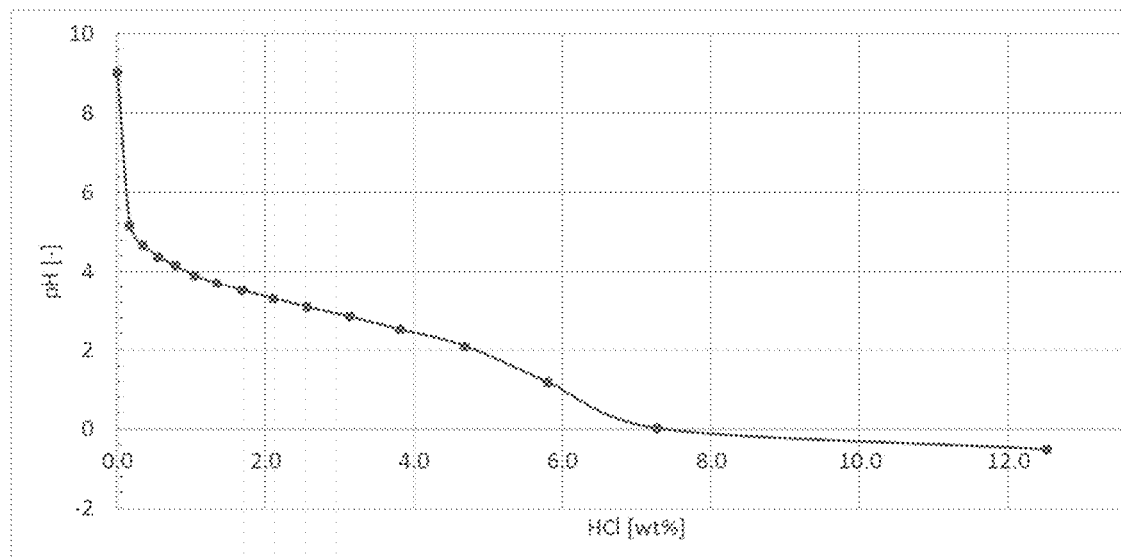
FIG. 1 is a plot of measured pH values of a solution comprising 10 wt % sodium salt of monochloroacetic acid (SMCA)+18.7 wt % sodium gluconate (NaG) as a function of hydrochloric acid concentration in the solution.

The following detailed description is merely exemplary in nature and is not intended to limit the disclosure or the application and uses of the subject matter as described herein. Furthermore, there is no intention to be bound by any theory presented in the preceding background or the following detailed description. It is to be appreciated that all numerical values as provided herein, save for the actual examples, are approximate values with endpoints or particular values intended to be read as "about" or "approximately" the value as recited.

The various aspects of the present disclosure will be elucidated further below.

As indicated above, the present disclosure is directed to a process for treating a subterranean earth formation by introducing a buffered acidizing treatment fluid comprising a monovalent salt of monochloroacetic acid and at least one acid into said subterranean earth formation, wherein the pH of the buffered acidizing treatment fluid is from about 1.2 to about 5, preferably from about 2 to about 4.6.

Such buffered acidizing treatment fluids have been found to provide delayed acidification fluids with increased calcium carbonate dissolution capacity. In this regard, it is believed that the buffer capacity of the monochloroacetic acid salt solution, upon addition of the acid, simultaneously reduces the rate of hydrolyzation of the monovalent salt of monochloroacetic acid into glycolic acid and the degree of dissociation of the acid. This tempers the reactivity of the acid, thereby inhibiting face dissolution at the injection site, and allowing for deeper penetration of the acidizing treatment fluid into the formation with effective dissolution of calcium carbonate. Once deep into the well, hydrolyzation of the monovalent salt of monochloroacetic acid into glycolic acid can continue the acidification, creating nicely formed wormholes, and thereby significantly improving the production of oil or gas.

The term "buffered acidizing treatment fluid" is used herein to refer to an aqueous solution comprising a monovalent salt of monochloroacetic acid and at least one acid that resists changes in pH when limited amounts of acid or base are added to it. By appropriate combinations of the monovalent salt of monochloroacetic acid and the at least one acid, a buffered acidizing treatment fluid can be obtained whose pH is between about 1.2 to about 5, preferably between about 2 to about 4.6. Such solutions have been found to be effective delayed acidification fluids, without suffering the drawbacks of using either the acid or the chlorocarboxylic acid salts alone.

In the present disclosure, a monovalent salt of monochloroacetic acid is used. "Monovalent salt of monochloroacetic acid" means that the cation in the monochloroacetate salt has a valency of one. The cation of the monovalent salt of monochloroacetic acid can be sodium, ammonium, lithium or potassium. Depending on the type of rock formation to be treated, the preferred cation of the salt can be chosen for the monochloroacetic acid salt. In the case of carbonate-based rock, the cation of the monochloroacetic acid salt is preferably sodium, potassium and/or lithium.

The cation of the salt of monochloroacetic acid is most preferably sodium (the sodium salt of monochloroacetic acid is hereinafter also denoted as SMCA).

The monovalent salt of monochloroacetic acid is preferably present in the buffered acidizing treatment fluid in an amount of at least 3 wt %, preferably at least 5 wt % and most preferably at least 10 wt %, based on the total weight of the buffered acidizing treatment fluid. The optimal amount of monovalent salt of monochloroacetic acid present in the buffered acidizing treatment fluid ranges from about 3 to about 20 wt %, preferably from about 5 to about 18 wt %, more preferably from about 8 to about 16 wt %, and most preferably from about 10 to about 15 wt %, based on the total weight of the buffered acidizing treatment fluid.

In addition to a monovalent salt of monochloroacetic acid, the buffered acidizing treatment fluid may comprise glycolic acid. Preferably, the buffered acidizing treatment fluid according to the present disclosure comprises a monovalent salt of monochloroacetic acid and less than 1 wt %, more preferably less than 0.1 wt % and most preferably no glycolic acid.

The at least one acid may be an inorganic or organic acid with a pKa value of about 5 or lower, preferably from about −10 to about 5, more preferably from about −7 to about 5. Preferably, the at least one acid is chosen such that upon reaction with a calcium salt, e.g., the calcium carbonate being present in carbonate-based rock, the acid forms a calcium salt with a solubility of at least 5 g/100 g $H_2O$, more preferably at least 10 g/100 g $H_2O$, and most preferably at least 15 g/100 g $H_2O$. This selection helps to prevent undesirable precipitation of calcium scale during acidation of the subterranean earth formation. In particular, the at least one acid may be selected from hydrochloric acid, chloric acid ($HClO_3$), hydrobromic acid (HBr), nitric acid ($HNO_3$), perchloric acid ($HClO_4$), hydroiodic acid (HI), formic acid, acetic acid, methanesulfonic acid (MSA), p-toluenesulfonic acid, or any combination thereof. Preferably, the at least one acid is selected from hydrochloric acid, formic acid, acetic acid, methanesulfonic acid (MSA), p-toluenesulfonic acid, or any combination thereof. Preferably, the at least one acid is not monochloroacetic acid.

The at least one acid is preferably present in the buffered acidizing treatment fluid in an amount of from about 0.2 to about 25 wt %, preferably from about 0.5 to about 20 wt %, more preferably from about 0.8 to about 15 wt %, and most preferably from about 1 to about 12 wt %, based on the total weight of the buffered acidizing treatment fluid.

When the acid is a strong acid, that is, an acid that completely dissociates in aqueous solution (Ka>1, pKa<1), e.g., hydrochloric acid, the buffered acidizing treatment fluid preferably contains from about 0.2 to about 8 wt % acid, more preferably from about 0.4 to about 6 wt % acid, more preferably from about 0.6 to about 5.5 wt % acid, and most preferably from about 1 to about 5 wt % acid. When the acid is a weak acid, that is, an acid that does not completely dissociate in aqueous solution (Ka<1, pKa>1), e.g., acetic acid, the buffered acidizing treatment fluid preferably contains from about 0.2 to about 25 wt % acid, preferably from about 0.8 to about 20 wt % acid, more preferably from about 1.5 to about 15 wt % acid, and most preferably from about 2 to about 12 wt % acid.

Preferably, the at least one acid is hydrochloric acid or acetic acid. As mentioned above, the buffer capacity of the monochloroacetic acid salt solution reduces the degree of dissociation of the added acid. This tempers the reactivity of the acid, thereby allowing HCl to be used down-well without suffering the known drawbacks, such as face dissolution at the injection site.

When the acid is hydrochloric acid, the buffered acidizing treatment fluid preferably contains from about 3 to about 20 wt % monovalent salt of monochloroacetic acid and from about 0.2 to about 8 wt % hydrochloric acid, more preferably from about 5 to about 18 wt % monovalent salt of monochloroacetic acid and from about 0.4 to about 6 wt % hydrochloric acid, more preferably from about 8 to about 16 wt % monovalent salt of monochloroacetic acid and from about 0.6 to about 5.5 wt % hydrochloric acid, and most preferably from about 10 to about 15 wt % monovalent salt of monochloroacetic acid and from about 1 to about 5 wt % hydrochloric acid, based on the total weight of the buffered acidizing treatment fluid.

When the acid is acetic acid, the buffered acidizing treatment fluid preferably contains from about 3 to about 20 wt % monovalent salt of monochloroacetic acid and from about 0.2 to about 25 wt % acetic acid, more preferably from about 5 to about 18 wt % monovalent salt of monochloroacetic acid and from about 0.8 to about 20 wt % acetic acid, more preferably from about 8 to about 16 wt % monovalent salt of monochloroacetic acid and from about 1.5 to about 15 wt % acetic acid, and most preferably from about 10 to about 15 wt % monovalent salt of monochloroacetic acid and from about 2 to about 12 wt % acetic acid, based on the total weight of the buffered acidizing treatment fluid.

The temperature of the subterranean earth formation into which the buffered acidizing treatment fluid is introduced is preferably at least 80° C., more preferably at least 100° C. The temperature of the earth formation preferably does not exceed 200° C., more preferably it does not exceed 180° C., and most preferably it does not exceed 160° C.

Preferably, the buffered acidizing treatment fluid comprises at least one element to suppress salt precipitation. However, it is also possible to introduce a salt precipitation suppression element into the subterranean earth formation prior to the introduction of a buffered treatment fluid comprising a monovalent salt of monochloroacetic acid and at least one acid. An "element to suppress salt precipitation" includes a chelating agent and a scaling inhibitor.

Suitable chelating agents comprise any compound capable of chelating calcium glycolate. The chelating agent may be an organic or an inorganic chelant. In some embodiments, the chelating agent comprises compounds that are monodentate, bidentate, tridentate, tetradentate, pentadentate, hexadentate, septadentate, octadentate, or a combination thereof.

Exemplary chelating agents include lactic acid, malonic acid, fumaric acid, citric acid, tartaric acid, glutamic acid diacetic acid (GLDA), methylglycine diacetic acid (MGDA), 1,1,4,4-butanetetracarboxylic acid, 1,2,3,4-butanetetracarboxylic acid, 4,5-imidazoledicarboxylic acid, phosphonic acid, 3-chloropropyl phosphonic acid, aminotris (methylene phosphonic acid) (ATMP), bis(hexamethylenetriaminepenta(methylene phosphonic acid) (BHMTPMPA), 1,2-cyclohexanediaminetetraacetic acid (CDTA), 1,4,7,10-tetraazacyclododecane-1,4,7,10-tetraacetic acid (DOTA), 1,4,7,10-tetraazacyclodedecane-1,4,7,10-tetraphosphonic acid (DOTP), diethylenetriamineepentaacetic acid (DTPA), diethylenetriaminepenta (methylene phosphonic acid) (DTPMP), ethanol-diglycinic acid (EDG), ethylenediamineteraacetic acid (EDTA), ethylene diamine tetra (methylene phosphonic acid) (EDTMPA), ethylenedioxybis(ethyliminodi(acetic acid)) (EGTA), hydroxyaminocarboxylic acid (HACA), 1-hydroxyethane 1,1-diphosphonic acid (HEDP), N-hydroxyethyl-ethylenediaminetriacetic acid (HEDTA), hydroxyethyleneiminodiacetate (HEIDA), N''-carboxymethyldiethylenetriamine-N,N,N', N''-tetraacetate (HDTP A), iminodiacetic acid (IDA), N,N'-bis(carboxymethyl)glycine (NTA), nitrolotripropionic acid (NTP), nitrilotrimethylenephosphonic acid (NTMP), sodium hexametaphosphate (SHMP), triethylenetetramine-N,N,N',N'',N''',N'''-hexaacetic acid (and N,N'-bis(butanamide) derivative) (TTHA), terpyridine, bypyridiene, triethylenetetramine, biethylenetriamine, bis (hexamethylenetriamine) (BHMT) and salts, derivatives and mixtures thereof.

A preferred chelating agent comprises at least one monovalent carboxylate salt group and furthermore comprises a carbon chain carrying at least five hydroxyl groups. The term "hydroxyl group" is used herein to refer to a functional group including a hydrogen atom covalently bonded to an oxygen atom (denoted as —OH). The term "hydroxyl group" as used herein, does not include the —OH moiety of a carboxyl group. The term "carboxyl" is used herein to refer to a carboxyl group in acid form (denoted as —COOH) or in neutral form (denoted as —COO⁻X⁺).

The number of carboxylate groups of the chelating agent n is preferably between 1 and 5. Preferred chelating agents are selected from the group including monovalent salts of glucaric acid, monovalent salts of gluconic acid, monovalent salts of glucoheptonic acid and other stereoisomers of 2,3,4,5,6-pentahydroxyhexanoic acid and 2,3,4,5,6,7-hexahydroxyheptanoic acid. Specific examples are sodium gluconate, sodium glucoheptonate, other stereoisomers of sodium 2,3,4,5,6-pentahydroxyhexanoate and sodium 2,3,4,5,6,7-hexahydroxyheptanoate. Most preferred is the use of sodium gluconate as chelating agent.

Preferably, more than 2 wt % of chelating agent is present in the buffered acidizing treatment solution. Preferably, the molar ratio between the monovalent salt of monochloroacetic acid and the chelating agent lies between 1:0.5/n and 1:10/n, n being the number of carboxylate groups of the chelating agent. Preferably, no more than 30 wt %, and preferably no more than 20 wt % of chelating agent is present in the acidizing treatment solution, based on the total weight of the acidizing treatment solution. The optimal amount of chelating agent present in the buffered acidizing treatment fluid ranges from about 2 to about 30 wt %, preferably from about 5 to about 27 wt %, more preferably from about 7 to about 22 wt %, and most preferably from about 8 to about 20 wt %, based on the total weight of the buffered acidizing treatment fluid.

The amount of said chelating agent used may be less than equimolar to the concentration of monochloroacetate salt in the buffered acidizing treatment fluid introduced. Normally, chelating agent would have to be added in equimolar amounts of the monochloroacetate salt added.

Suitable scaling inhibitors include any compound that inhibits the formation of calcium glycolate scales. Exemplary scaling inhibitors include polyacrylic acids, sulfonated polyacrylic acids, sulfonated polycarboxylates, maleic copolymers, phosphoric polycarboxylic acids, sulfonated styrene/maleic acid copolymer and phosphonates.

A preferred scaling inhibitor comprises a homopolymer of maleic acid or acrylic acid or a copolymer of maleic acid and acrylic acid, having a total number of carboxyl groups between 5 and 200, or a salt thereof, wherein the homopolymer or copolymer optionally contains one or more phosphonic or sulfonic functional groups, and wherein total number of carboxyl groups is calculated from the weight average molecular weight of the homopolymer or copolymer as determined by size exclusion chromatography relative to polymethacrylic acid standards. Preferably, the scaling inhibitor has a total number of carboxyl groups between 7 and 100, and more preferably between 10 and 90.

The term "homopolymer" is used herein to refer to a polymer that is derived from one species of monomer, i.e., maleic acid or acrylic acid, but which may also contain one or more phosphonic or sulfonic functional groups. Likewise, the term "copolymer" is used herein to refer to a polymer derived from more than one species of monomer, i.e., maleic acid and acrylic acid, but which may also contain one or more phosphonic or sulfonic functional groups. When the homopolymer or copolymer contains phosphonic or sulfonic functional groups, these functional groups are preferably present in an amount of from 1 to 5 functional groups, preferably from 1 to 3 functional groups, and more preferably 1 or 2 functional groups per average homopolymer/copolymer. The scaling inhibitor may contain no phosphonic or sulfonic functional groups.

The presence (or absence) of phosphonic or sulfonic functional groups can be determined by $^1$H, $^{13}$C and $^{31}$P-NMR analysis. For example, using a proton resonance frequency of 600 MHz, a carbon resonance frequency of 150 MHz and a phosphorous resonance frequency of 243 MHz. The sample spectrum can be quantified by calibration with a known molar concentration of NMR standard, and the number of phosphonic groups present per average homopolymer or copolymer chain can be calculated from the results. In the case of sulfonic groups, NMR alone will only provide a qualitative picture, i.e., the structure of the organic surround can be revealed. In order to quantify the number of sulfonic groups present per average homopolymer or copolymer, an additional technique, such as Inductive Couple Plasma techniques (e.g. ICP-MS), is required.

Suitable examples of such scaling inhibitors are the commercially available scale inhibitors Dequest P9000 (supplied by Italmatch Chemicals), Drewsperse 747A (supplied by Solenis), Belclene 200, Belclene 245, Belclene 283 and Belclene 499 (supplied by BWA Water Additives), Sokalan PA30, Sokalan 12S and Sokalan 20PN (supplied by BASF) and Acumer 1050 (supplied by Dow).

The amount of scaling inhibitor used may be kept relatively low so as to avoid cost increases and limit environmental burden. The amount of the scale inhibitor in the buffered acidizing treatment fluid that is introduced into the subterranean earth formation lies preferably between about 0.005 and about 7.5 wt %, more preferably about 0.05 and about 5 wt %, and most preferably between about 0.4 and about 2 wt %, based on the total weight of the buffered acidizing treatment fluid. If the scale inhibitor is introduced separate from a buffered acidizing treatment fluid comprising a monovalent salt of monochloroacetic acid, preferably, the scale inhibitor is used in an amount of between 0.005 and 10 wt %, preferably between 0.05 and 7.5 wt %, and most preferably between 0.4 wt % and 5 wt %, based on the total weight of the buffered acidizing treatment fluid. The amount of scaling inhibitor specified herein refers to the active content of the scaling inhibitor. Thus, if 1 wt % of a scale inhibitor solution with 50% active content is added to the buffered acidizing treatment fluid, the amount of scaling inhibitor present in the fluid, according to the present disclosure, is 0.5 wt %.

Preferably, both a scaling inhibitor and a chelating agent are used. It has been found that with the use of a scaling inhibitor, lower amounts of chelating agent could be used, and vice versa, further lowering the costs and environmental burden.

The present disclosure is further directed to a buffered acidizing treatment fluid comprising
(i) a monovalent salt of monochloroacetic acid;
(ii) at least one acid; and
(iii) optionally, an element to suppress salt precipitation,
wherein the pH of the buffered acidizing treatment fluid is from about 1.2 to about 5, preferably from about 2 to about 4.6.

As set out above, the buffered acidizing treatment fluid of the present disclosure may contain from about 3 to about 20 wt % monovalent salt of monochloroacetic acid and from about 0.2 to about 25 wt % of at least one acid, preferably from about 5 to about 18 wt % monovalent salt of monochloroacetic acid and from about 0.5 to about 20 wt % of at least one acid, more preferably from about 8 to about 16 wt % monovalent salt of monochloroacetic acid and from about 0.8 to about 15 wt % of at least one acid, and most preferably from about 10 to about 15 wt % monovalent salt of monochloroacetic acid and from about 1 to about 12 wt % of at least one acid, based on the total weight of the buffered acidizing treatment fluid.

The buffered acidizing treatment fluid may further comprise one or more compounds selected from the group of mutual solvents, anti-sludge agents, (water-wetting or emulsifying) surfactants, corrosion inhibitors, corrosion inhibitors intensifiers, foaming agents, wetting agents, diverting agents, oxygen scavengers, carrier fluids, fluid loss additives, friction reducers, stabilizers, rheology modifiers, breakers, salts, brines, pH control additives such as further acids and/or bases, bactericides/biocides, particulates, cross-linkers, salt substitutes (such as tetramethyl ammonium chloride), relative permeability modifiers, sulfide scavengers, fibres, nanoparticles, combinations thereof, or the like.

A mutual solvent is a chemical additive that is soluble in oil, water, acids (often HCl based), and other well treatment fluids. Mutual solvents are routinely used in a range of applications, controlling the wettability of contact surfaces before, during and/or after a treatment, and preventing or breaking emulsions. Suitable mutual solvents are ketones, alcohols or esters.

The surfactant can be any surfactant known to the person skilled in the art for use in oil and gas wells. Preferably, the surfactant is a nonionic, amphoteric, anionic or cationic surfactant, even more preferably a cationic surfactant.

Anti-sludge agents stabilize the acid-oil emulsion and include alkyl phenols, fatty acids, and anionic surfactants. Frequently used as the surfactant is a blend of a sulfonic acid derivative and a dispersing surfactant in a solvent. Such a blend generally has dodecyl benzene sulfonic acid (DDBSA) or a salt thereof as the major dispersant, i.e. anti-sludge, component.

Corrosion inhibitors may be selected from the group of amine and quaternary ammonium compounds and sulfur compounds. Examples are diethyl thiourea (DETU), which is suitable up to 185° F. (about 85° C.), alkyl pyridinium or quinolinium salt, such as dodecyl pyridinium bromide (DDPB), and sulfur compounds, such as thiourea or ammonium thiocyanate, which are suitable for the range 203-302° F. (about 95-150° C.), benzotriazole (BZT), benzimidazole (BZI), dibutyl thiourea, a proprietary inhibitor called TIA, and alkyl pyridines.

One or more corrosion inhibitor intensifiers may be added, such as for example formic acid, potassium iodide, antimony chloride, or copper iodide.

In general, the most successful inhibitor formulations for organic acids and chelating agents contain amines, reduced sulfur compounds or combinations of a nitrogen compound (amines, quats or polyfunctional compounds) and a sulfur compound. The amount of corrosion inhibitor is preferably between 0.1 and 2.0 volume % on total fluid.

Wetting agents that may be suitable for use in this present disclosure include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art.

One or more salts may be used as rheology modifiers to modify the rheological properties (e.g., viscosity and elastic properties) of the treatment fluids. These salts may be organic or inorganic. When adding salts care should be taken not to detrimentally affect the pH and therewith detrimentally affect the hydrolyzation rate.

Alternative rheology modifiers may include organic or inorganic gelling agents and/or viscosifiers. Examples of commonly used rheology modifiers include, but are not limited to, biopolymers, polysaccharides such as guar gums, xanthan gum, and derivatives thereof, cellulose derivatives such as hydroxyethyl cellulose (HEC), viscoelastic surfactants, and synthetic polymers and oligomers such as poly (ethylene glycol) [PEG], poly(diallyl amine), poly(acrylamide), poly(aminomethyl propyl sulfonate) [AMPS polymer], poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinyl pyrrolidone), poly(vinyl lactam), and co-, ter-, and quaterpolymers of the following (co-)monomers: ethylene, butadiene, isoprene, styrene, divinyl benzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinyl pyrrolidone, and vinyl lactam. Yet other rheology modifiers include clay-based viscosifiers, especially laponite and other small fibrous clays such as the polygorskites (attapulgite and sepiolite). When using polymer-containing viscosifiers, the viscosifiers may be used in an amount of up to 5% by weight of the fluid.

The use of brines is known in the art. Any brine chosen should be compatible with the formation and should have a sufficient density to provide the appropriate degree of well control.

Additional salts may be added to a water source, e.g., to provide a brine, and a resulting treatment fluid, in order to have a desired density. The amount of salt to be added should be the amount necessary for formation compatibility, such as the amount necessary for the stability of clay minerals, taking into consideration the crystallization temperature of the brine, e.g., the temperature at which the salt precipitates from the brine as the temperature drops. Preferred suitable brines may include seawater and/or formation brines.

It is noted that various elements of the present disclosure, including but not limited to preferred ranges for the various parameters, can be combined unless they are mutually exclusive.

The present disclosure will be elucidated by the following examples without being limited thereto or thereby.

EXAMPLES

Molecular Weight Measurement

Molecular weights were determined by conventional size exclusion chromatography (SEC) relative to polymethacrylic acid (PMA) standards, with refractive index (RI) and ultraviolet (UV) detectors, under the conditions listed below. The analyses were performed on the samples as received. Solutions were prepared by diluting with the eluent to the desired concentration.

The samples were analyzed using the Wyatt MALS system. Only the RI and UV detector signals were used for data evaluation. The base column used was a PL Aquagel-OH 30 column, unless the molecular size of the sample was too high. In such cases, a TSKgel GMPWxl column was used instead.

| Parameter | Setting/description |
|---|---|
| Instrument | Agilent 1260 Infinity II |
| Columns | (A) 2x PL Aquagel-OH 30 7.8 × 300 mm + pre column; or |
| | (B) 2x TSKgel GMPWxl |
| MW range | (A) 500-60,000 g/mol |
| | (B) 500-1,000,000 g/mol |
| Mobile Phase | 50 mM Na Acetate; 0.02% m/v Sodium Azide; pH 6 (Acetic acid) |
| Flow | 0.5 mL/min |
| Injection volume | 50 µL |

-continued

| Parameter | Setting/description |
|---|---|
| Sample concentration | ca. 1.3 mg/mL |
| Column T | 35° C. |
| Filtration | Eluent 0.2 μm RC filter; sample solutions 0.45 μm RC filter |
| Detection UV | Agilent 1260 Infinity VWD, 254 nm |
| Detection Refractive Index | Agilent 1260 Infinity RID |
| Detection Intrinsic Viscosity | WYATT ViscoStar II (signals not used in this study) |
| Detection MALS | WYATT DAWN Heleos-II (signals not used in this study) |
| Conventional calibration parameters | Multipoint calibration line using polymethacrylic acid Na-salt standards with Mw 1250, 3570, 4700, 5840, 6610, 7830, and 22500 g/mol (PSS) |
| Data processing | Astra 7.3.2.19 (Wyatt) |

Example 1: Dissolution of $CaCO_3$ in the Presence of SMCA and Hydrochloric Acid The effect of hydrochloric acid on the $CaCO_3$ dissolution capacity of a SMCA solution was studied. Two vials were filled with two different SMCA solutions, one comprising 0.40 g SMCA (2 wt % based on total weight of the solution in the vial) and the other comprising 0.40 g SMCA (2 wt % based on total weight of the solution in the vial)+0.20 g HCl (1 wt % based on total weight of the solution in the vial). Thereafter 0.45 g of $CaCO_3$ was added to the 20 grams of acidizing fluid in each vial. The vials were put in an oil bath and kept at a temperature of 80° C. until the dissolution reaction stopped. Both vials were emptied over a filter to collect the residual $CaCO_3$ and after drying in the oven the residual mass of $CaCO_3$ was measured.

As can be seen in Table 1, the dissolution capacity of the 2 wt % SMCA with additional 1 wt % HCl is 2.52× larger compared to the 2 wt % SMCA solution without added HCl.

TABLE 1

Results of $CaCO_3$ dissolution tests with SMCA solutions with and without HCl.

| wt % SMCA used | wt % HCl used | Amount of SMCA (g) | Amount of HCl (g) | Amount of $CaCO_3$ (g) | Residual $CaCO_3$ (g) | Add. dissolution capacity |
|---|---|---|---|---|---|---|
| 2 | 0 | 0.40 | 0 | 0.45 | 0.273 | |
| 2 | 1 | 0.40 | 0.20 | 0.45 | 0.0033 | +252% |

Example 2: Dissolution of $CaCO_3$ in the Presence of SMCA, Acid and a Chelating Agent The experiment described in Example 1 was repeated, but with a SMCA solution having a concentration of 10 wt % and higher. To avoid precipitation of calcium glycolate, an equimolar amount of sodium gluconate (NaG) was added to the solution. The effect of two acids, i.e., hydrochloric acid (HCl) and acetic acid (HAc), on the dissolution capacity of $CaCO_3$ was tested.

The experiments were performed using 20 grams acidizing solution at ambient pressure. First, solutions in Milli-Q water were made with SMCA concentrations between 10 and 16 wt %. An equimolar amount, based on SMCA, of NaG was added to the solutions. The HCl or HAc was added afterwards, with an amount of 25 mol % based on SMCA. The compositions of the different solutions are listed in Table 2A and 2B.

$CaCO_3$ was added to the samples at a constant molar ratio of $CaCO_3$ to total acid. After addition of $CaCO_3$ to the samples, the vials were placed in an oil bath kept at 80° C. The vials were kept in the oil bath until the $CaCO_3$ was dissolved. After that, the vials were placed in an oven at 40° C. for 3 days, and for another three days at 30° C. At this point all of the vials were inspected for solid formation. As can be seen from Tables 2A and 2B, all samples with a SMCA concentration up to 11 wt % showed no precipitation with HCl or HAc.

TABLE 2A

Composition of 100 g SMCA solution in Milli-Q water with acetic acid

| Sample # | SMCA (g) | NaG (g) | HAc (g) | $CaCO_3$ (g) | Resulting solution @30° C. |
|---|---|---|---|---|---|
| 0 | 10.03 | 18.73 | 1.72 | 0.9705 | clear |
| 1 | 11.02 | 20.61 | 1.88 | 1.0724 | clear |
| 2 | 12.07 | 22.49 | 2.06 | 1.1715 | solids |
| 3 | 13.09 | 24.31 | 2.24 | 1.2661 | solids |
| 4 | 14.06 | 26.31 | 2.44 | 1.3613 | solids |
| 5 | 15.00 | 28.30 | 2.58 | 1.4607 | solids |

TABLE 1B

Composition of 100 g SMCA solution in Milli-Q water with hydrochloric acid

| Sample # | SMCA (g) | NaG (g) | 36% HCl (g) | $CaCO_3$ (g) | Resulting solution @30° C. |
|---|---|---|---|---|---|
| 10 | 10.14 | 18.63 | 2.90 | 0.9760 | clear |
| 11 | 11.13 | 20.58 | 3.19 | 1.0773 | clear |
| 12 | 12.14 | 22.48 | 3.49 | 1.1753 | solids |
| 13 | 13.34 | 24.26 | 3.78 | 1.2653 | solids |
| 14 | 14.11 | 26.22 | 4.06 | 1.3604 | solids |
| 15 | 15.03 | 28.05 | 4.37 | 1.4661 | solids |
| 16 | 16.02 | 29.77 | 4.65 | 1.5549 | solids |

It was also found that the dissolution capacity of a 11 wt % SMCA solution could be increased by at least one third without formation of solids when an acid was added

Example 3: pH Profile of a Solution Comprising SMCA, Acid and Sodium Gluconate In order to determine the buffer capacity of the SMCA solution, aqueous solutions with 10 wt % SMCA and an equimolar amount of sodium gluconate (NaG) (18.7 wt %) were made with increasing amounts of hydrochloric acid or acetic acid, up to a maximum concentration of 12 wt %. The concentrations mentioned here in wt % are based on a percentage of the total solution. The pH was measured for all prepared solutions and the results are shown in FIGS. 1 and 3.

Figure 2:
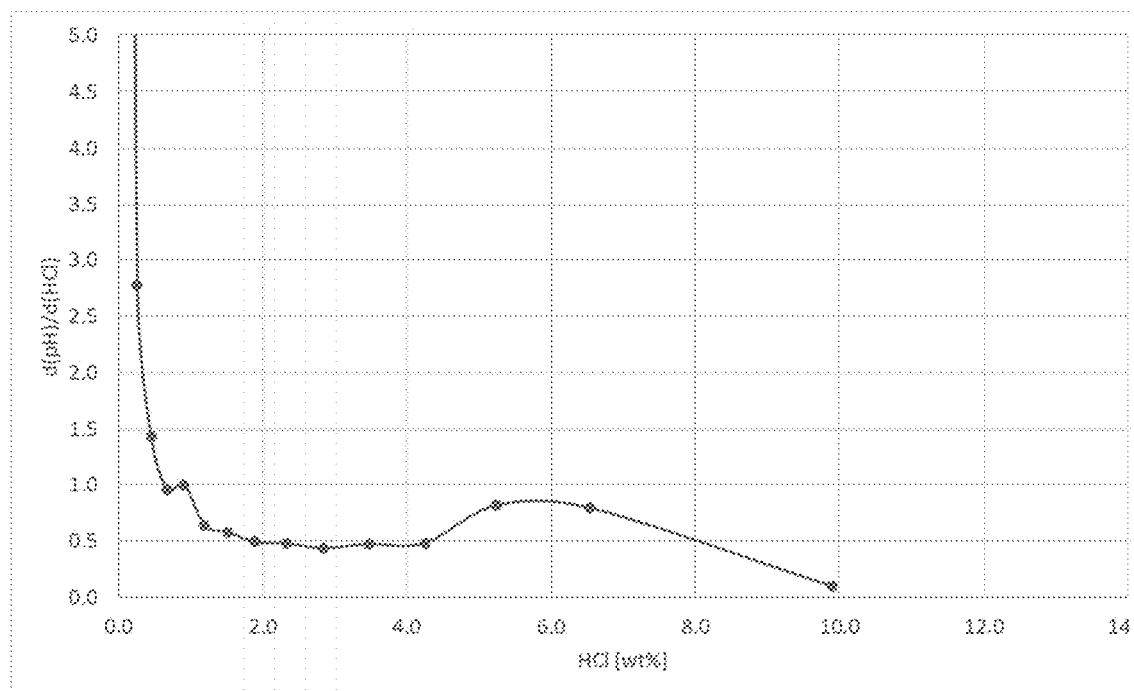
FIG. 2 is a plot of the pH gradient (ΔpH/ΔHCl) of FIG. 1, as a function of hydrochloric acid concentration in the solution.

It was found that the pH curve for HCl shows a decrease with a constant slope in the HCl concentration range between 1.2 and 4 wt % (see FIG. 1). This is further illustrated in FIG. 2 where the pH gradient (dpH/dHCl) is plotted against HCl concentration, showing a region where the gradient is almost constant.

Figure 3:
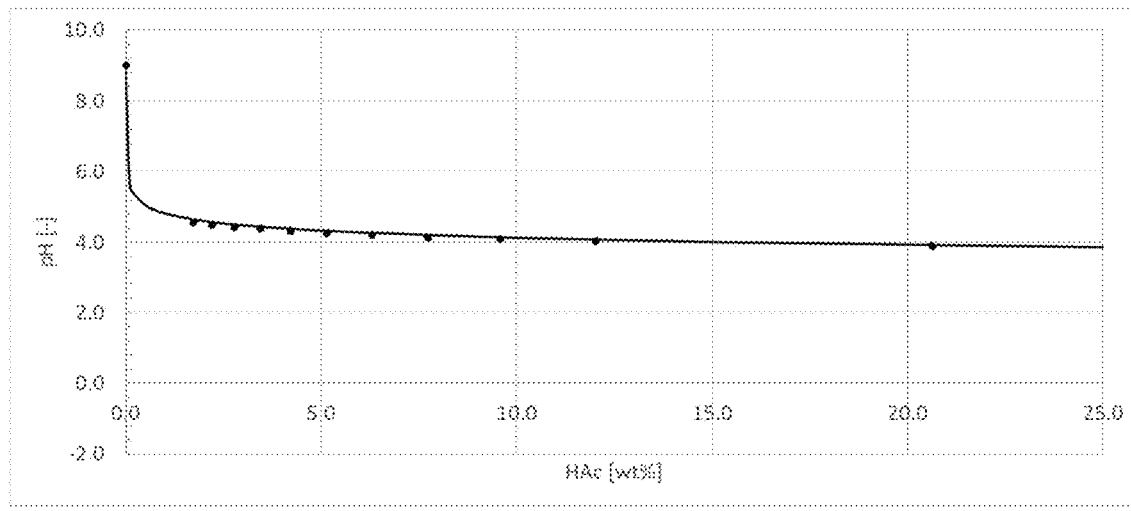
FIG. 3 is a plot of measured pH values of a solution comprising 10 wt % SMCA+18.7 wt % NaG as a function of acetic acid concentration in the solution.
Figure 4:
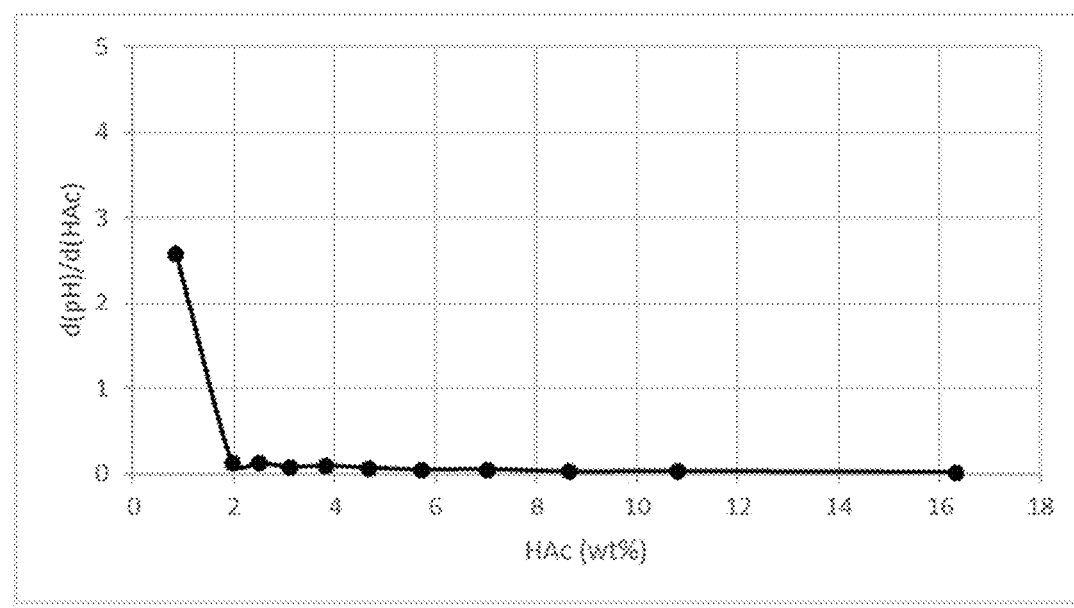
FIG. 4 is a plot of the pH gradient (ΔpH/ΔHAc) of FIG. 3, as a function of acetic acid concentration in the solution.

In case of addition of HAc to the SMCA solution, the pH curve also shows a HAc concentration region where the gradient is constant, i.e., from 1.7 to 16 wt % (see FIGS. 3 and 4).

This shows that the dissolution capacity of the SMCA solution can be increased significantly by addition of an acid, while the pH of the solution remains in the moderate pH regime (i.e., between 1.2 and 5, and even better between 2 and 4.6).

Example 4: Dissolution of $CaCO_3$ Using a Solution of SMCA and a Chelating Agent with Increasing Amounts of Added Acid The solutions made in Example 3 were used for $CaCO_3$ dissolution experiments.

The experiments were performed using 20 grams acidizing fluid at ambient pressure. The $CaCO_3$ amount added was equal to 85% of the molar amount of total acid present in the solution. After addition of the $CaCO_3$ the amount of gas formation was visually observed (see Tables 4A and 4B). Here, "homogeneous bubbles" is used to refer to bubbles that have similar size and "heterogeneous bubbles" is used to refer to bubbles that have different sizes, i.e., small to large. Homogeneous bubbling is the preferable result since heterogeneous bubbling and foaming both indicate very fast dissolution of the $CaCO_3$ (exemplified by the rate of $CO_2$ generation), and thus an increased risk of face dissolution.

Thereafter all the vials were placed in an oil bath of 80° C. and after 24 hours all the $CaCO_3$ was dissolved. None of the samples showed precipitation of solids.

The results with HCl indicate that no foaming was observed up to a concentration of about 4.7 wt % HCl. This is in line with the results shown in Example 3, where a buffered region was found. The results with acetic acid show no foaming even up to high concentrations. Again, this is in line with the results shown in Example 3, since in this case the pH remained higher than 4.

TABLE 4A

Observations after addition of $CaCO_3$ to SMCA solution comprising 10 wt % SMCA, 18.7 wt % sodium gluconate and different concentrations of HAc

| Sample # | HAc (wt %) | pH | Observation |
| --- | --- | --- | --- |
| 1 | 1.72 | 4.58 | Homogeneous bubbles/no foaming |
| 2 | 2.21 | 4.52 | Homogeneous bubbles/no foaming |
| 3 | 2.78 | 4.45 | Homogeneous bubbles/no foaming |
| 4 | 3.44 | 4.4 | Homogeneous bubbles/no foaming |
| 5 | 4.22 | 4.33 | Homogeneous bubbles/no foaming |
| 6 | 5.16 | 4.27 | Homogeneous bubbles/no foaming |
| 7 | 6.30 | 4.22 | Homogeneous bubbles/no foaming |
| 8 | 7.73 | 4.15 | Homogeneous bubbles/no foaming |
| 9 | 9.57 | 4.11 | Homogeneous bubbles/no foaming |
| 10 | 12.03 | 4.05 | Homogeneous bubbles/no foaming |

TABLE 4B

Observations after addition of $CaCO_3$ to SMCA solution comprising 10 wt % SMCA, 18.7 wt % sodium gluconate and different concentrations of HCl

| Sample # | HCl (wt %) | pH | Observation |
| --- | --- | --- | --- |
| 1 | 1.04 | 3.89 | Homogeneous bubbles/no foaming |
| 2 | 1.34 | 3.7 | Homogeneous bubbles/no foaming |
| 3 | 1.69 | 3.5 | Homogeneous bubbles/no foaming |
| 4 | 2.09 | 3.3 | Homogeneous bubbles/no foaming |
| 5 | 2.56 | 3.08 | Homogeneous bubbles/no foaming |
| 6 | 3.13 | 2.83 | Homogeneous bubbles/no foaming |
| 7 | 3.81 | 2.51 | Homogeneous bubbles/no foaming |
| 8 | 4.68 | 2.09 | Homogeneous bubbles/no foaming |
| 9 | 5.80 | 1.18 | Homogeneous bubbles/little foaming |
| 10 | 7.27 | 0.01 | Homogeneous bubbles/little foaming |
| 11 | 12.52 | −0.52 | Heterogeneous bubbles/strong foaming |

Whilst the present disclosure has been described with reference to an exemplary embodiment, it will be appreciated that various modifications are possible within the scope of the present disclosure.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than to mean 'consisting of'. All prior teachings acknowledged above are hereby incorporated by reference. No acknowledgement of any prior published document herein should be taken to be an admission or representation that the teaching thereof was common general knowledge in Europe or elsewhere at the date hereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A process for treating a subterranean earth formation by introducing a buffered acidizing treatment fluid comprising a monovalent salt of monochloroacetic acid and at least one acid into the subterranean earth formation, wherein the pH of the buffered acidizing treatment fluid is from about 1.2 to about 5,
   wherein an element to suppress salt precipitation is also introduced into the subterranean earth formation and
   wherein the element to suppress salt precipitation is
   a chelating agent comprising at least one monovalent carboxylate salt group and furthermore comprises a carbon chain carrying at least five hydroxyl groups, and/or
   a scale inhibitor comprising a homopolymer of maleic acid or acrylic acid or a copolymer of maleic acid and acrylic acid, having a total number of carboxyl groups between 5 and 200, or a salt thereof, wherein the homopolymer or copolymer optionally comprises one or more phosphonic or sulfonic functional groups, and wherein total number of carboxyl groups is calculated from the weight average molecular weight of the homopolymer or copolymer as determined by size exclusion chromatography relative to polymethacrylic acid standards.

2. The process as claimed in claim 1, wherein the at least one acid is an inorganic or organic acid with a pKa value of about 5 or lower and/or the at least one acid, upon reaction with a calcium salt, forms a calcium salt with a solubility of at least about 5 g/100 g $H_2O$.

3. The process as claimed in claim 1, wherein the at least one acid is chosen from hydrochloric acid, chloric acid ($HClO_3$), hydrobromic acid (HBr), nitric acid ($HNO_3$), perchloric acid ($HClO_4$), hydroiodic acid (HI), formic acid, acetic acid, methanesulfonic acid (MSA), p-toluenesulfonic acid, and any combination thereof.

4. The process as claimed in claim 1, wherein the monovalent salt of monochloroacetic acid is present in the buffered acidizing treatment fluid in an amount of from about 3 to about 20 wt %, based on the total weight of the buffered acidizing treatment fluid.

5. The process as claimed in claim 1, wherein the at least one acid is present in the buffered acidizing treatment fluid in an amount of from about 0.2 to about 25 wt %, based on the total weight of the buffered acidizing treatment fluid.

6. The process as claimed in claim 1, wherein the chelating agent comprises sodium gluconate.

7. The process as claimed in claim 1, wherein the element to suppress salt precipitation is present in the buffered acidizing treatment fluid in an amount of from about 0.01 to about 30 wt %, based on the total weight of the buffered acidizing treatment fluid.

8. The process as claimed in claim 1, wherein the subterranean earth formation comprises carbonate-based rock.

9. The process of claim 1 wherein the at least one acid is hydrochloric acid.

10. The process of claim 9 wherein the hydrochloric acid is present in an amount of from about 1 to about 12.5 wt %, based on the total weight of the buffered acidizing treatment fluid.

11. The process of claim 1 wherein the at least one acid is present in an amount of from about 1 to about 12.5 wt %, based on the total weight of the buffered acidizing treatment fluid.

12. A process for treating a subterranean earth formation by introducing a buffered acidizing treatment fluid comprising a monovalent salt of monochloroacetic acid and at least one acid into the subterranean earth formation, wherein the pH of the buffered acidizing treatment fluid is from about 1.2 to about 5, wherein sodium gluconate is also introduced into the subterranean earth formation to suppress salt precipitation.

13. The process as claimed in claim 12, wherein the at least one acid is an inorganic or organic acid with a pKa value of about 5 or lower and/or the at least one acid, upon reaction with a calcium salt, forms a calcium salt with a solubility of at least about 5 g/100 g $H_2O$.

14. The process as claimed in claim 12, wherein the at least one acid is chosen from hydrochloric acid, chloric acid ($HClO_3$), hydrobromic acid (HBr), nitric acid ($HNO_3$), perchloric acid ($HClO_4$), hydroiodic acid (HI), formic acid, acetic acid, methanesulfonic acid (MSA), p-toluenesulfonic acid, and any combination thereof.

15. The process as claimed in claim 12, wherein the monovalent salt of monochloroacetic acid is present in the buffered acidizing treatment fluid in an amount of from about 3 to about 20 wt %, based on the total weight of the buffered acidizing treatment fluid.

16. The process as claimed in claim 12, wherein the at least one acid is present in the buffered acidizing treatment fluid in an amount of from about 0.2 to about 25 wt %, based on the total weight of the buffered acidizing treatment fluid.

17. The process as claimed in claim 12, wherein the sodium gluconate is present in the buffered acidizing treatment fluid in an amount of from about 0.01 to about 30 wt %, based on the total weight of the buffered acidizing treatment fluid.

18. The process as claimed in claim 12, wherein the at least one acid is hydrochloric acid.

19. The process as claimed in claim 18, wherein the hydrochloric acid is present in an amount of from about 1 to about 12.5 wt %, based on the total weight of the buffered acidizing treatment fluid.

20. The process as claimed in claim 12, wherein the at least one acid is present in an amount of from about 1 to about 12.5 wt %, based on the total weight of the buffered acidizing treatment fluid.

* * * * *